(12) United States Patent
Kerselaers et al.

(10) Patent No.: US 11,296,750 B2
(45) Date of Patent: Apr. 5, 2022

(54) NEAR-FIELD WIRELESS DEVICE INCLUDING A FIRST NEAR-FIELD ANTENNA AND A SECOND NEAR-FIELD ANTENNA

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 16/872,995

(22) Filed: May 12, 2020

(65) Prior Publication Data
US 2021/0359722 A1    Nov. 18, 2021

(51) Int. Cl.
*H04B 5/00* (2006.01)
*H01Q 7/00* (2006.01)

(52) U.S. Cl.
CPC .......... *H04B 5/0031* (2013.01); *H01Q 7/005* (2013.01); *H04B 5/0037* (2013.01); *H04B 5/0081* (2013.01); *H04B 5/0093* (2013.01)

(58) Field of Classification Search
CPC ......... H02J 50/00; H04B 5/00; H04B 5/0031; H04B 5/0081; H04B 5/0093; H01Q 7/005
USPC ...................................................... 307/104
See application file for complete search history.

(56) References Cited

U.S. PATENT DOCUMENTS

| 5,701,037 | A | * | 12/1997 | Weber | H01L 23/48 257/531 |
| 6,133,886 | A | * | 10/2000 | Fariello | H01Q 1/241 343/702 |
| 8,190,086 | B2 | * | 5/2012 | Sasaki | H04B 5/02 455/41.1 |
| 10,320,086 | B2 | * | 6/2019 | Kerselaers | H01Q 7/08 |
| 10,812,126 | B1 | * | 10/2020 | Kerselaers | H04B 1/385 |
| 10,862,542 | B1 | * | 12/2020 | Kerselaers | H04B 5/0081 |
| 10,944,447 | B1 | * | 3/2021 | Kerselaers | H04B 13/005 |
| 11,050,463 | B2 | * | 6/2021 | Hiemstra | H04B 1/0343 |
| 2009/0196388 | A1 | * | 8/2009 | Fukaishi | H01L 23/48 375/360 |
| 2011/0021138 | A1 | * | 1/2011 | Rofougaran | H04B 1/40 455/39 |
| 2011/0156488 | A1 | * | 6/2011 | Kuroda | H01L 23/5227 307/104 |
| 2012/0146240 | A1 | * | 6/2012 | Dairiki | H01Q 9/0407 257/777 |

(Continued)

FOREIGN PATENT DOCUMENTS

JP    2018189406 A    * 11/2018

*Primary Examiner* — Adi Amrany (57) ABSTRACT

One example discloses a near-field wireless device, including: a stack of layers distributed along a first axis; a first near-field antenna having a conductive surface and embedded in a first layer within the stack of layers; wherein the conductive surface is configured to carry non-propagating quasi-static near-field electric-induction signals for on-body near-field communications; a second near-field antenna having an inductive loop and embedded in a second layer within the stack of layers; wherein the inductive loop is configured to carry non-propagating quasi-static near-field magnetic-induction signals for off-body near-field communications; wherein the first and second layers are different layers; and wherein the first and second antennas are not in galvanic contact.

16 Claims, 5 Drawing Sheets

(56) References Cited

U.S. PATENT DOCUMENTS

| | | | |
|---|---|---|---|
| 2012/0169472 A1* | 7/2012 | Ikemoto | H01Q 1/2225 340/10.1 |
| 2013/0260803 A1* | 10/2013 | Ikemoto | H04B 5/0031 455/500 |
| 2014/0213184 A1 | 7/2014 | Matsubara | |
| 2015/0318603 A1 | 11/2015 | Kerselaers et al. | |
| 2015/0318896 A1* | 11/2015 | Kerselaers | H02J 5/005 455/41.1 |
| 2016/0329931 A1* | 11/2016 | Mukherjee | H04B 5/0012 |
| 2017/0062949 A1 | 3/2017 | Kerselaers et al. | |
| 2017/0126282 A1 | 5/2017 | Fromm et al. | |

\* cited by examiner

NEAR-FIELD WIRELESS DEVICE INCLUDING A FIRST NEAR-FIELD ANTENNA AND A SECOND NEAR-FIELD ANTENNA

The present specification relates to systems, methods, apparatuses, devices, articles of manufacture and instructions for near-field wireless devices.

SUMMARY

According to an example embodiment, a near-field wireless device, comprising: a stack of layers distributed along a first axis; a first near-field antenna having a conductive surface and embedded in a first layer within the stack of layers; wherein the conductive surface is configured to carry non-propagating quasi-static near-field electric-induction signals for on-body near-field communications; a second near-field antenna having an inductive loop and embedded in a second layer within the stack of layers; wherein the inductive loop is configured to carry non-propagating quasi-static near-field magnetic-induction signals for off-body near-field communications; wherein the first and second layers are different layers; and wherein the first and second antennas are not in galvanic contact.

In another example embodiment, the conductive surface forms a first planar surface; and the inductive loop forms a second planar surface.

In another example embodiment, the conductive surface of the first near-field antenna is configured to be coupled to an on-body surface by the non-propagating quasi-static near-field electric-induction signals; and the inductive loop of the second near-field antenna is configured to be coupled to an off-body near-field wireless device by the non-propagating quasi-static near-field magnetic-induction signals.

In another example embodiment, further comprising a substrate embedded in a third layer within the stack of layers; wherein the conductive surface of the first near-field antenna is on one side of the substrate; and wherein the inductive loop of the second near-field antenna is on a side opposite to the one side of the substrate.

In another example embodiment, the substrate has a permeability larger than ambient air.

In another example embodiment, the first near-field antenna further includes an inductive loop configured to carry non-propagating quasi-static near-field magnetic-induction signals for on-body near-field communications; and the substrate is configured to attenuate the near-field magnetic-induction signals generated by the second near-field antenna during off-body communications from interfering with near-field magnetic-induction signals received by the first near-field antenna during on-body communications.

In another example embodiment, further comprising a set of supporting circuits also on the side opposite to the one side of the substrate; wherein the first near-field antenna further includes an inductive loop configured to carry non-propagating quasi-static near-field magnetic-induction signals for on-body near-field communications; and wherein the substrate is configured to attenuate magnetic fields generated by the supporting circuits from interfering with near-field magnetic-induction signals received by the first near-field antenna during on-body communications.

In another example embodiment, the second near-field antenna is configured to be coupled to a off-body NFC reader by the non-propagating quasi-static near-field magnetic-induction signals.

In another example embodiment, the first near-field antenna and the second near-field antenna are both NFEMI (near-field electromagnetic induction) antennas.

In another example embodiment, the device is configured to position the conductive surface of the first near-field antenna closer to a user's body than the inductive loop of the second near-field antenna.

In another example embodiment, further comprising a cavity passing through each of the stack of layers distributed along the first axis; and wherein the cavity is configured to be coupled to a sensor configured to measure an on-body user attribute.

In another example embodiment, the sensor is a glucose sensor.

In another example embodiment, the on-body near-field communications are hosted by a user's body including at least one of: a human body, a vehicle body, a robot, a docking device, a physical coupling system, or a tool or storage station on an assembly line.

In another example embodiment, the device is embedded in at least one of: a wearable, a glucose monitor, a medical device, a smart watch, an earbud, a hearing aid, a headphone, an activity tracker, or a heart rate monitor.

In another example embodiment, further comprising a controller and a power source internal to the wireless device; wherein controller is configured to self-initiate communications between the device and a second wireless device using the first near-field antenna and the power source; and wherein controller is configured to receive power and respond to communications from a third wireless device using the second near-field antenna.

In another example embodiment, the second near-field antenna is an NFC antenna.

In another example embodiment, controller is configured to charge the power source using the received power from the third wireless device.

In another example embodiment, further comprising a controller; wherein controller is configured to prevent signal transmission from the first near-field antenna and the second near-field antenna at a same time.

In another example embodiment, further comprising a controller; wherein the first near-field antenna includes a first set of feed points configured to be coupled to a first tuning circuit; wherein the second near-field antenna includes a second set of feed points configured to be coupled to a second tuning circuit; and wherein the controller electrically separates the first tuning circuit from the second tuning circuit.

In another example embodiment, the tuning circuits include a set of capacitive and resistive tuning parameters; the capacitive tuning parameters are configured to separately adjust a resonance frequency for the first and second antennas; and the resistive tuning parameters are configured to separately adjust an operational bandwidth of the first and second antennas.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are near-field interactions between one or more near-field devices on a user's body or the body of a conductive surface (i.e. on-body devices), and other conductive surfaces and/or other wireless devices (i.e. off-body devices) based on either near-field electromagnetic induction (NFEMI), where the transmitter and receiver are coupled by both magnetic (H) and electric (E) fields, near-field electric induction (NFEI), where the transmitter and receiver are coupled by electric (E) fields, and near-field magnetic induction (NFMI/NFC), where the transmitter and receiver are coupled by magnetic (H) fields. While RF wireless communication is accomplished by propagating an RF plane wave through free space, NFEMI, NFEI, NFMI and NFC communicates using non-propagating quasi-static E and/or H field signals.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the near-field device's carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the near-field device's carrier frequency and in some example embodiments has extra capacitance surfaces at both ends.

The quasi-static characteristic of these fields is a result of the near-field antenna's dimensions in combination with their carrier frequencies. Most of the near-field energy is stored in the form of magnetic and electric fields, while a small amount of RF energy inevitably propagates in free space. Small antenna geometries minimize radiating waves in free space.

Some near-field devices may employ Near-Field Magnetic Induction (NFMI, aka NFC) as a wireless communication method. In NFMI/NFC wireless communication, two loosely coupled coils realize signal transfer. No radiation of radio waves takes place. A current flowing in the transmission coil generates a H-field which in turn induces a current in the receiving coil. In this way, wireless communication is accomplished. H-field based NFMI systems with small antenna coils can have a limited range that may be much smaller than an entire wearable user's body. Such H-field communications can also be sensitive to coil orientation.

Some near-field devices employ Near-field Electric Induction (NFEI)) as a wireless communication method. NFEI allows electronic devices on and near a conductive surface (e.g. a human body) to exchange information through E-field coupling (e.g. at 21 MHz). NFEI is also sometimes called Body Coupled Communication (BCC). While E-field based NFEI signals can have a greater range than H-field based NFMI signals, the E-field signal strength can vary with regard to body posture and is sensitive to body movements. The body can even partially block a capacitive return path, thereby increasing E-field channel loss and reliable and robust wireless communication is not possible.

Devices that employ both Near-Field Magnetic Induction and Near-field Electric Induction antennas are often called Near-Field Electromagnetic Induction (NFEMI) devices.

Now discussed are near-field based wireless device antenna structures and operational modes supporting both on-body and off-body communications. The antenna structures include one antenna for on-body communications and another antenna for off-body communications. The operational modes include an active-mode and a passive-mode.

Figure 1:
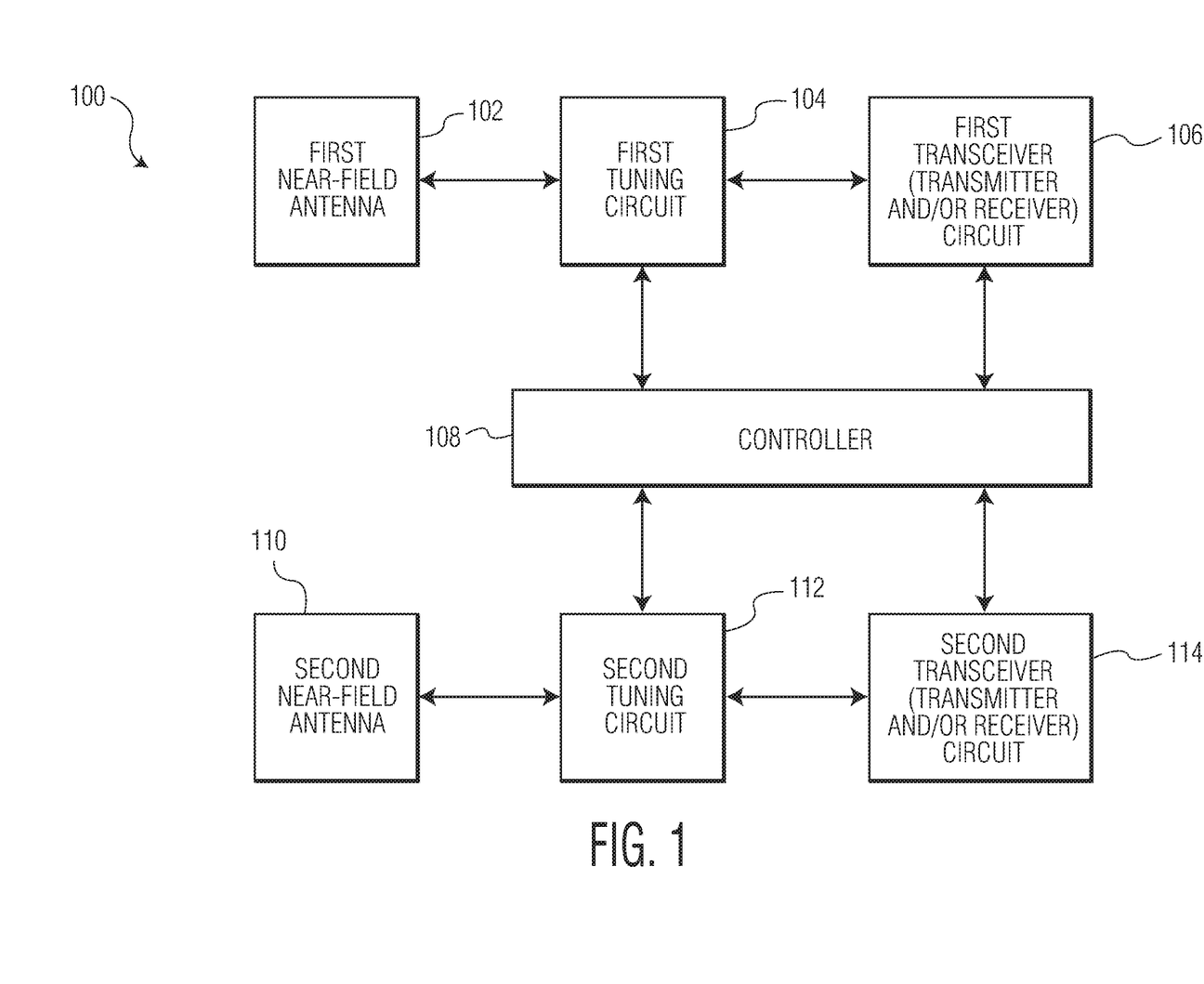
FIG. 1 is an example of a near-field wireless device.

FIG. 1 is an example of a near-field wireless device 100. The example near-field wireless device 100 includes a first near-field antenna 102, a first tuning circuit 104, a first transceiver circuit 106, a controller 108, a second near-field antenna 110, a second tuning circuit 112, and a second transceiver circuit 114.

In various example embodiments, the first near-field antenna 102 includes a near-field electric-induction antenna (e.g. such as either a NFEI or NFEMI antenna) and is configured for on-body communications. The second near-field antenna 114 includes a near-field magnetic-induction antenna (e.g. such as an NFC antenna) and is configured for off-body communications.

In some example embodiments, the second near-field antenna 114 can be configured to transmit power to the wireless device that otherwise might be in a sleep state and/or have a depleted battery. This power could be used just to initiate a download of data from wireless device or to also recharge the wireless device.

Figure 2A:
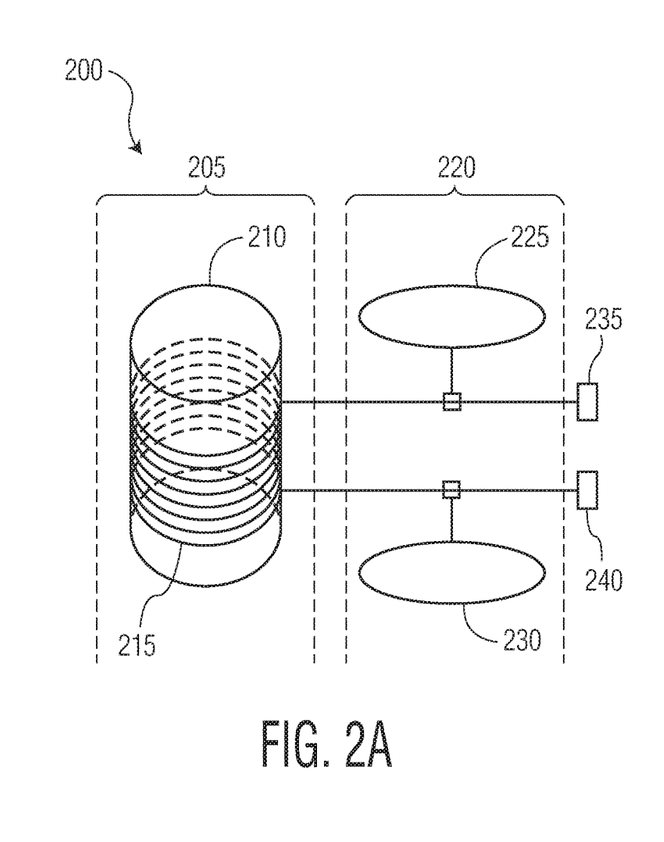
FIG. 2A is a first example near-field antenna in the wireless device.
Figure 2B:
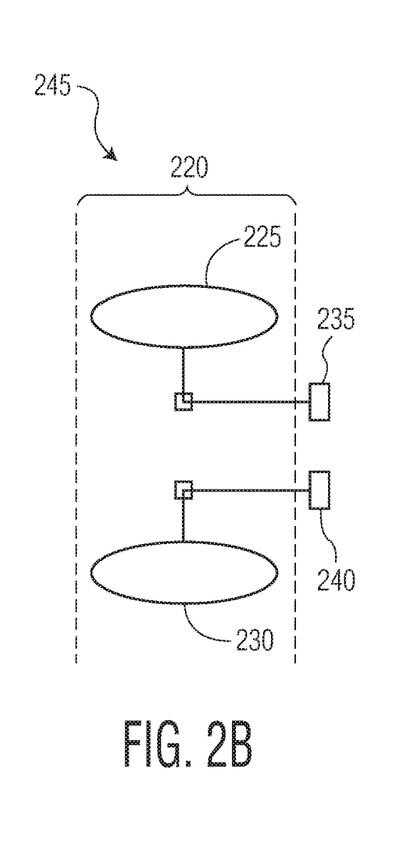
FIG. 2B is a second example near-field antenna in the wireless device.
Figure 2C:
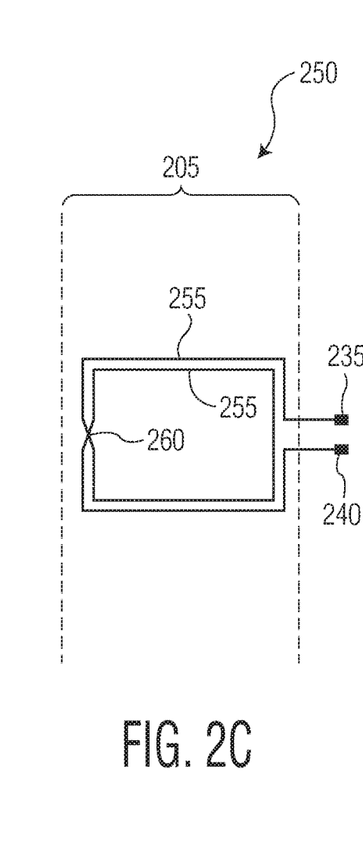
FIG. 2C is a third example near-field antenna in the wireless device.

Example embodiments of the near-field antennas 102, 110 are presented and further discussed with respect to FIGS. 2A, 2B and 2C to follow.

The controller 108 is configured to monitor and maintain the device's 100 operational resonance frequency and operational bandwidth/quality factor of the near-field signals carried by the near-field antennas 102, 110. The controller 108 is configured to adjust tuning parameters in the tuning circuits 104, 112 if either the operational resonance frequency are different from preselected resonance frequencies and/or the operational bandwidths are different from preselected bandwidths.

Either or both of the tuning circuits 104, 112 can be configured to adjust the device's 100 resonance frequencies using a capacitive bank (C-bank), and bandwidth using a resistive bank (R-bank) in response to signals from the controller 108. The C-bank and R-bank discretes are in some examples about 130 pF and 5000 ohms respectively to support the required resonance frequency (e.g. 10.6 MHz) and bandwidth (e.g. 400 KHz). The controller 108 is configured to adjust (e.g. increment/decrement) the C-bank and R-bank values using the tuning circuits 104, 112. Example embodiments of the tuning circuits 104, 112 are presented and further discussed with respect to FIG. 3 to follow.

In various example embodiments, the transceiver circuits 106, 114 can be configured by the controller 108 to help adjust the resonance frequencies and bandwidths by injecting test signals (e.g. three test signals) into the tuning circuits 104, 112 and the antennas 102, 110. The controller 108 can then be configured to: first, monitor a loading of the near-field antennas 102, 110; second, adjust the tuning parameters if the loading is different from a preselected loading.

In some example embodiments, the controller 108 is configured to place the wireless device 100 in at least two operational modes, using one or both of the antennas 102, 110.

In an active-mode, the wireless device 100 is configured to self-initiate communications with other on-body wireless devices (not shown) using near-field electric induction (NFEI) or near-field electromagnetic induction (NFEMI). For example, an on-body glucose sensor in a first near-field wireless device can be configured to communicate the glucose sensor's readings to a second on-body near-field wireless device that collects the glucose sensor's readings and perhaps other user medical information as well.

In the passive-mode, the wireless device 100 is configured to communicate with a third off-body wireless device (not shown) only in response to an externally-prompted (e.g. query-response) communication from the third wireless device using near-field magnetic induction (NFMI or NFC). For example, the third off-body wireless device could be a smartphone/NFC reader that energizes the second on-body near-field wireless device that collected the glucose sensor's readings, and thereby prompts the second on-body near-field wireless device to transmit the collected the glucose sensor's readings to the smartphone/NFC reader.

Note, while example embodiments discussed herein refer to a user's body, on-body and off-body, in alternate embodiments the near-field device 100, body is herein broadly defined to include at least: a human's body, an animal's body, a body of a living organism, a body structure of an inanimate object, a robot, a vehicle, a docking system, a physical coupling system, a station on an assembly line, and so on.

FIG. 2A is a first example 200 near-field antenna in the wireless device 100. In this example the antenna 200 is a near-field electromagnetic induction (NFEMI) antenna. In some example embodiments, the antenna 200 includes a loop/coil (H-field) antenna 205 for magnetic fields, in conjunction with a short loaded dipole (E-field) antenna 220 for electric fields. The H-field antenna 205 includes a ferrite core 210 wound with a helical wire 215. The E-field antenna 220 includes two conductive loading surfaces 225 and 230. Antenna 200 feed points 235, 240 are coupled to various transceiver circuitry, such as a downstream radio transmitter and receiver integrated circuit (RF-IC), (not shown here). The antenna 200 can be tuned to resonate at a communication frequency by means of reactance components that are integrated in the RF-IC. The antenna's 200 bandwidth can similarly be tuned using the reactance components.

When the NFEMI antenna 200 is proximate to a conductive structure (e.g. a structure having one or more conductive surfaces, a body, a person, an object, etc.) the magnetic and electric fields will be substantially confined to the conductive surface and not significantly radiate in free-space. This enhances security and privacy of such body networked communications.

In various example embodiments, the antenna 200 operates at or below 50 MHz (e.g. for example at 30 MHz) to ensure that the fields are following the conductive surface's contours and to ensure that far field radiation is strongly reduced.

FIG. 2B is a second example 245 near-field (e.g. near-field electric induction (NFEI)) antenna in the wireless device 100. The second example near-field antenna 245 consists of just the short loaded dipole (E-field) antenna 220 portion of the first example near-field antenna 200.

FIG. 2C is a third example 250 near-field (e.g. near-field magnetic induction (NFMI/NFC)) antenna in the wireless device 100. The third example near-field antenna 250 consists of a different structural embodiment of the loop/coil (H-field) antenna 205 portion of the first example near-field antenna 200. This different structural embodiment of the coil (H-field) antenna 205 includes a planar wire 255 formed into two loops with a cross-over 260. The cross-over 260 enables current within the wire's 255 inner and outer portions to flow in balance thereby reduces or eliminates the antenna's 250 undesired E-field component while not affecting the antenna's 250 desired H-field component.

Figure 3:
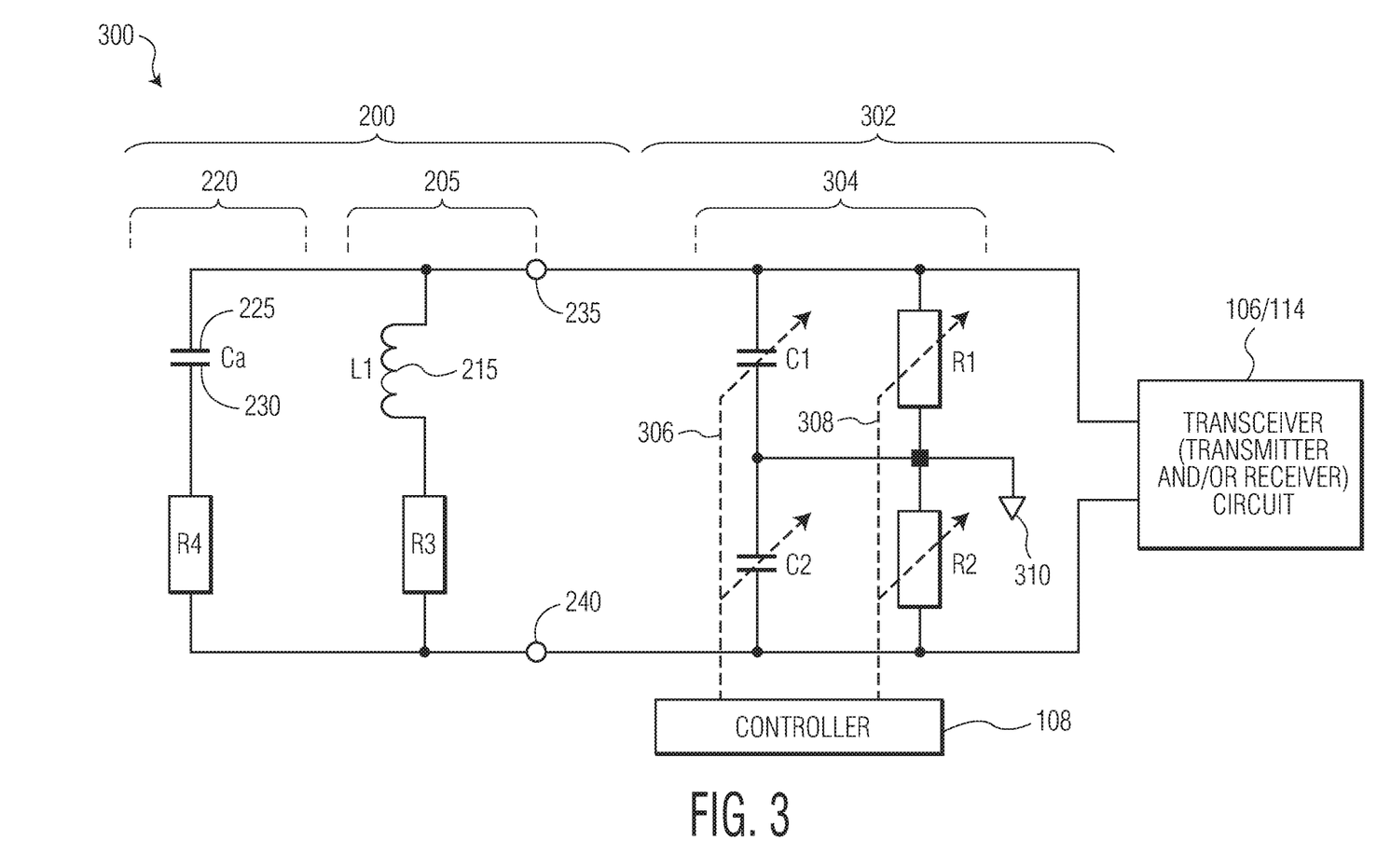
FIG. 3 is an example circuit for the near-field device.

FIG. 3 is an example circuit 300 for the near-field device 100. Note, while the example circuit 300 is discussed with respect to the first example near-field antenna 200 (NFEMI) of FIG. 2A, in alternate embodiments, the first example near-field antenna 200 portion could be replaced with the second example near-field antenna 245 (NFEI) of FIG. 2B.

The example circuit 300 includes the first example near-field antenna 200 (NFEMI), supporting circuits 302, transceiver circuit 112/118, and is configured to communicate (i.e. transmit and/or receive) using non-propagating quasi-static near-field signals.

The idealized first example near-field antenna 200 includes the magnetic (H-field) antenna 205 having a resistance (R3) and an inductance (L1), the electric (E-field) antenna 220 having a conductive structure formed from the two loading plates 225 and 230, and the two feeding points 235, 240.

The supporting circuits 302 include a tuning circuit 304 and the controller 108.

The tuning circuit 304 is coupled to the first and second feed points 235, 240. The tuning circuit 304 includes a first variable tuning capacitance bank (C1), a second variable tuning capacitance bank (C2), a first variable tuning resistance bank (R1), and a second variable tuning resistance bank (R2). The capacitance banks and resistance banks are coupled to a reference potential 310 (e.g. a ground potential). The capacitive banks are coupled to the controller 108 by control line 306, and the resistance banks are coupled to the controller 108 by control line 308.

The controller 108 adjusts the first and second capacitance banks (C1), (C2) to adjust a resonant frequency of the magnetic 205 and the electric 220 antennas (e.g. to 10.6 MHz). The controller 108 adjusts the first and second resistance banks (R1), (R2) to adjust a bandwidth of the magnetic 205 and the electric 220 antennas (e.g. to 400

KHz) sufficient to allow the non-propagating quasi-static near-field signal to be received from the antennas 205, 220.

In some example embodiments, the capacitance banks (C1), (C2) are equally tuned using the control line 306 from the controller 108, and the resistance banks (R1), (R2) are equally tuned using the control line 308 from the controller 108.

The transceiver circuit 112/118 can be configured for either balanced or unbalanced operation.

Figure 4A:
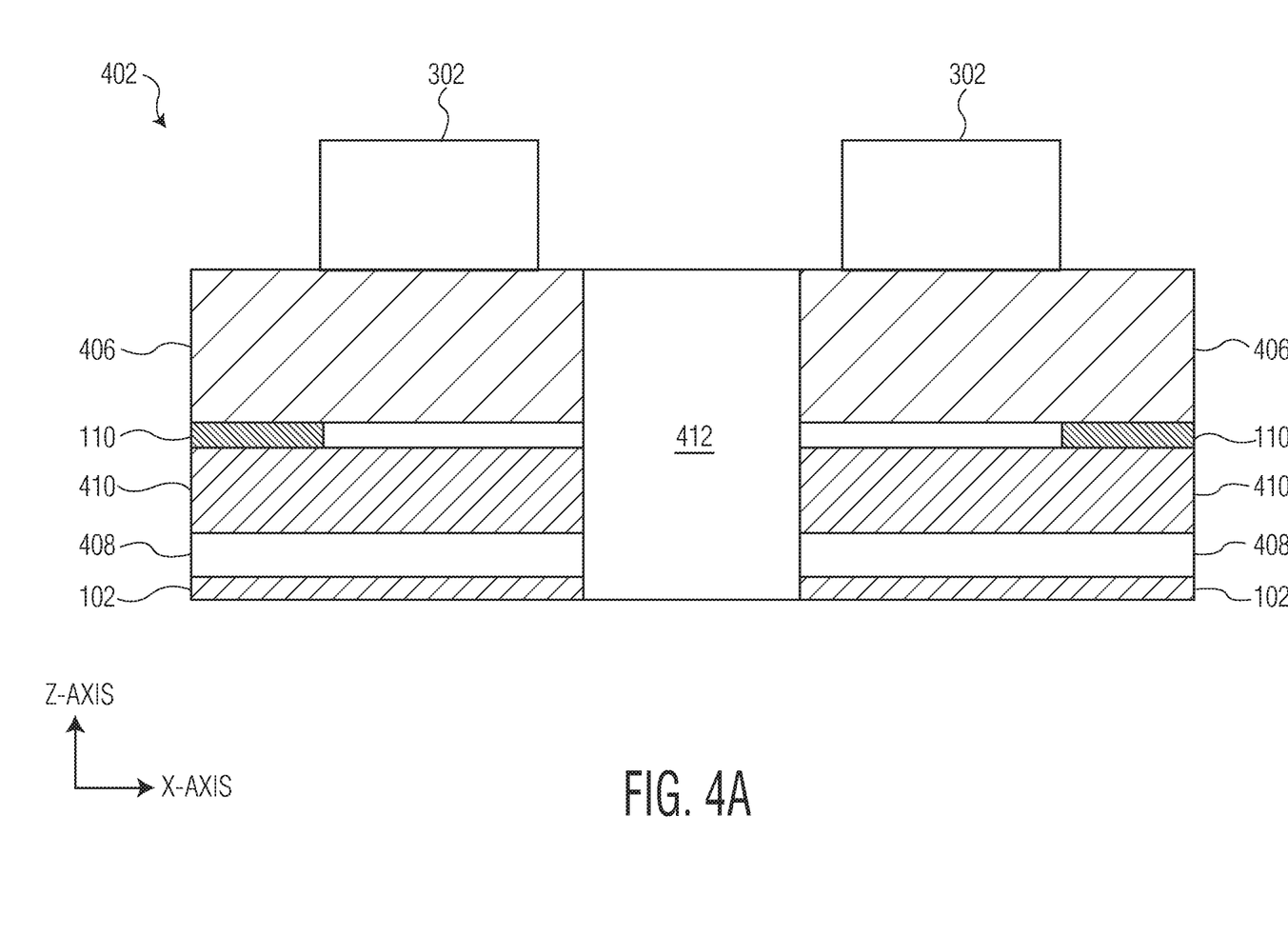
FIG. 4A is an example side view of one example embodiment of the near-field wireless device.
Figure 4B:
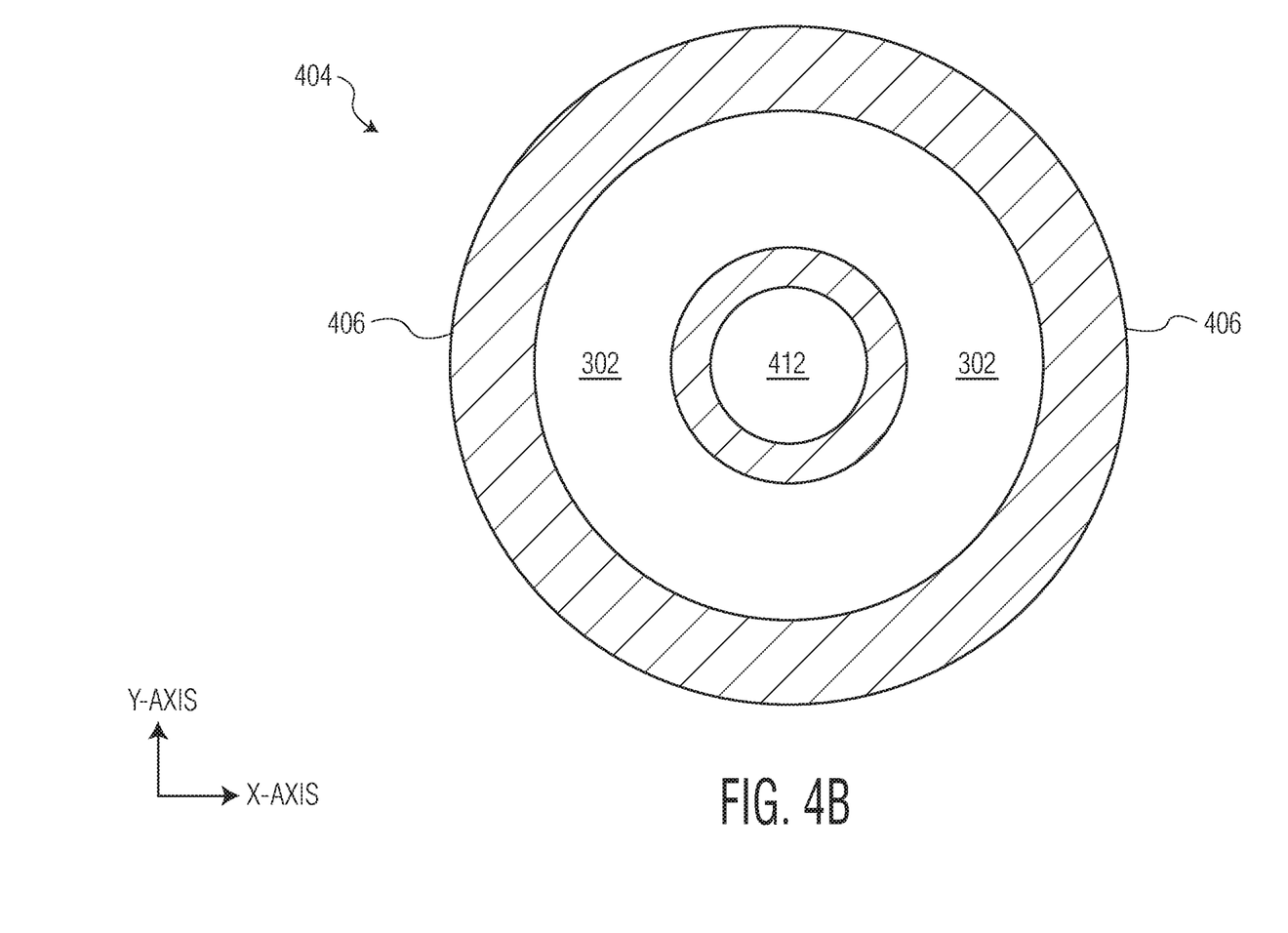
FIG. 4B is an example top view of the one example embodiment of the near-field wireless device.

FIG. 4A is an example side view 402 of one example embodiment of the near-field wireless device 100. FIG. 4B is an example top view 404 of the one example embodiment of the near-field wireless device 100. FIGS. 4A and 4B are now discussed together.

The example side view 402 shows the first near-field antenna 102, the second near-field antenna 110, and the supporting circuits 302 of the near-field wireless device 100. The example side view 402 further shows a first substrate 406, a second substrate 408, a third substrate 410, and a cavity 412. Not all example embodiments of the near-field wireless device 100 will include elements 302, 406, 408, 410, and 412.

In this example embodiment of the near-field wireless device 100, the first near-field antenna 102 at least includes an NFEI antenna, such as shown in FIG. 2B and is designed to be closer to a user's body than the second near-field antenna 110 for better on-body E-field communication. The first near-field antenna 102 can be capacitively or galvanically coupled to the user's body.

The second near-field antenna 110 at least includes an NFMI/NFC antenna, such as shown in FIG. 2C and is designed to be further from the user's body than the first near-field antenna 102 for better off-body H-field communication.

In other example embodiments of the near-field wireless device 100 both the first near-field antenna 102 and the second near-field antenna 110 could be NFEMI antennas such as shown in FIG. 2A.

The first and second substrates 406, 408 in some example embodiments have a permittivity larger than air (e.g. permittivity of 4) and the third substrate 410 has a permeability larger than air (e.g. permeability of 100).

In this particular example embodiment, the antennas 102, 110 and substrates 406, 408, 410 are interleaved and stacked as shown in FIG. 4A. Other stackings and arrangements are also possible.

Since the third substrate 410 is positioned between the first antenna 102 and the supporting circuits 302, it provides additional attenuation of any magnetic (H-field) and electric (E-field) interference generated by the supporting circuits 302 from adding noise to the near-field signals received by the first antenna 102.

The first antenna 102, if in the FIG. 2A configuration with the coil (H-field) antenna 205, is particularly sensitive to magnetic field interference from the supporting circuits 302 when used in active mode and receiving H-field signals at a relative low field strength from other on-body near-field wireless devices.

In contrast, the second near-field antenna 110 is less sensitive to magnetic field interference from the supporting circuits 302 if in H-field communications with a powerful NFC reader (e.g. smartphone) positioned close to the second near-field antenna 110 due to the relatively stronger magnetic field signals from the NFC reader.

The third substrate 410, as positioned between the first and second antennas 102, 110 and having a higher permeability than air, additionally functions so as to attenuate near-field signals generated by the first and second antennas 102, 110 from interfering with each other. Thus the third substrate 410 in such a positioning enables a more compact near-field wireless device 100 structure which can then be embedded within smaller form-factors (e.g. glucose monitoring devices). In some example embodiments, the wireless device 100 having such a positioning may have a diameter of 20 mm or less.

The supporting circuits 302 may be further augmented by other sensing and/or mechanical components. In some example embodiments, these additional components (e.g. a glucose sensor) can be embedded within the cavity 412. Note that some example embodiments do not have the cavity 412.

In some example embodiments, the controller 108 can configure just one or both antennas 102, 110 to be active (e.g. transmitting/receiving, sleep/standby, etc.) at a same time to further reduce near-field signal interference and/or device 100 power consumption.

In the active-mode, introduced in FIG. 1, the controller 108 can configure the wireless device 100 for on-body or off-body communications only when an internal power source (e.g. a battery) is sufficiently charged. In the passive-mode the controller 108 can configure the wireless device 100 for off-body communications only when either in a sleep/standby state or if the internal power source (e.g. a battery) is depleted. In some example embodiments, a depleted wireless device 100 battery can be recharged in the passive-mode until the wireless device 100 is sufficiently charged to resume active-mode communications.

In various applications, the near-field wireless device 100 can be embedded in various wearables for wireless on-body networks that require a small form factor. Medical applications, for example glucose monitoring system that is worn on-body are also possible. In such a glucose monitoring application, a glucose sensor positioned in the cavity 412 is positioned very close to the user's body near the first near-field antenna 102. The measured glucose level in the user's blood is near-field wirelessly communicated using on-body communication to an insulin pump worn by the user and having embedded a second near-field wireless device 100. A third near-field wireless device 100 in a smartphone, using NFC, and then energize the second near-field antenna 110 and read back the measured glucose data for further medical support.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices.

A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A near-field wireless device, comprising:
a stack of three layers distributed along a first axis;
a first near-field antenna having a conductive surface and embedded in a first layer within the stack of layers;
wherein the conductive surface is configured to carry non-propagating quasi-static near-field electric-induction signals for on-body near-field communications;
wherein the first near-field antenna further includes an inductive loop configured to carry non-propagating quasi-static near-field magnetic-induction signals for on-body near-field communications;
a second near-field antenna having an inductive loop and embedded in a second layer within the stack of layers;
wherein the inductive loop of the second near-field antenna is configured to carry non-propagating quasi-static near-field magnetic-induction signals for off-body near-field communications;
wherein the first and second layers are different layers; and
wherein the first and second antennas are not in galvanic contact;
further comprising a substrate embedded in a third layer within the stack of layers;
wherein the conductive surface of the first near-field antenna is on one side of the substrate; and
wherein the inductive loop of the second near-field antenna is on a side opposite to the one side of the substrate; and
wherein the substrate is configured to attenuate the near-field magnetic-induction signals generated by the second near-field antenna during off-body communications from interfering with near-field magnetic-induction signals received by the first near-field antenna during on-body communications.

2. The device of claim 1:
wherein the conductive surface forms a first planar surface; and
wherein the inductive loop forms a second planar surface.

3. The device of claim 1:
wherein the substrate has a permeability larger than ambient air.

4. The device of claim 1:
wherein the first near-field antenna and the second near-field antenna are both NFEMI (near-field electromagnetic induction) antennas.

5. The device of claim 1:
wherein the device is configured to position the conductive surface of the first near-field antenna closer to a user's body than the inductive loop of the second near-field antenna.

6. The device of claim 1:
further comprising a cavity passing through each of the stack of layers distributed along the first axis; and
wherein the cavity is configured to be coupled to a sensor configured to measure an on-body user attribute.

7. The device of claim 6:
wherein the sensor is a glucose sensor.

8. The device of claim 1:
wherein the on-body near-field communications are hosted by a user's body including at least one of: a human body, a vehicle body, a robot, a docking device, a physical coupling system, or a tool or storage station on an assembly line.

9. The device of claim 1:
wherein the device is embedded in at least one of: a wearable, a glucose monitor, a medical device, a smart watch, an earbud, a hearing aid, a headphone, an activity tracker, or a heart rate monitor.

10. The device of claim 1:
further comprising a controller and a power source internal to the wireless device;
wherein controller is configured to self-initiate communications between the device and a second wireless device using the first near-field antenna and the power source; and wherein controller is configured to receive power and respond to communications from a third wireless device using the second near-field antenna.

11. The device of claim 10:
wherein the second near-field antenna is an NFC antenna.

12. The device of claim 10:
wherein controller is configured to charge the power source using the received power from the third wireless device.

13. The device of claim 1:
further comprising a controller;
wherein controller is configured to prevent signal transmission from the first near-field antenna and the second near-field antenna at a same time.

14. The device of claim 1:
further comprising a controller;
wherein the first near-field antenna includes a first set of feed points configured to be coupled to a first tuning circuit;
wherein the second near-field antenna includes a second set of feed points configured to be coupled to a second tuning circuit; and
wherein the controller electrically separates the first tuning circuit from the second tuning circuit.

15. The device of claim 14:
wherein the tuning circuits include a set of capacitive and resistive tuning parameters;
wherein the capacitive tuning parameters are configured to separately adjust a resonance frequency for the first and second antennas; and
wherein the resistive tuning parameters are configured to separately adjust an operational bandwidth of the first and second antennas.

16. A near-field wireless device, comprising:
a stack of three layers distributed along a first axis;
a first near-field antenna having a conductive surface and embedded in a first layer within the stack of layers;
wherein the conductive surface is configured to carry non-propagating quasi-static near-field electric-induction signals for on-body near-field communications;
wherein the first near-field antenna further includes an inductive loop configured to carry non-propagating quasi-static near-field magnetic-induction signals for on-body near-field communications;
a second near-field antenna having an inductive loop and embedded in a second layer within the stack of layers;
wherein the inductive loop of the second near-field antenna is configured to carry non-propagating quasi-static near-field magnetic-induction signals for off-body near-field communications;
wherein the first and second layers are different layers; and
wherein the first and second antennas are not in galvanic contact;
further comprising a substrate embedded in a third layer within the stack of layers;
wherein the conductive surface of the first near-field antenna is on one side of the substrate; and
wherein the inductive loop of the second near-field antenna is on a side opposite to the one side of the substrate;
further comprising a set of supporting circuits also on the side opposite to the one side of the substrate; and
wherein the substrate is configured to attenuate magnetic fields generated by the supporting circuits from interfering with near-field magnetic-induction signals received by the first near-field antenna during on-body communications.

* * * * *